March 2, 1954
W. M. HARCUM
2,670,911
AUTOMATIC RECOVERY PILOT FOR AIRCRAFT
Filed Jan. 24, 1951
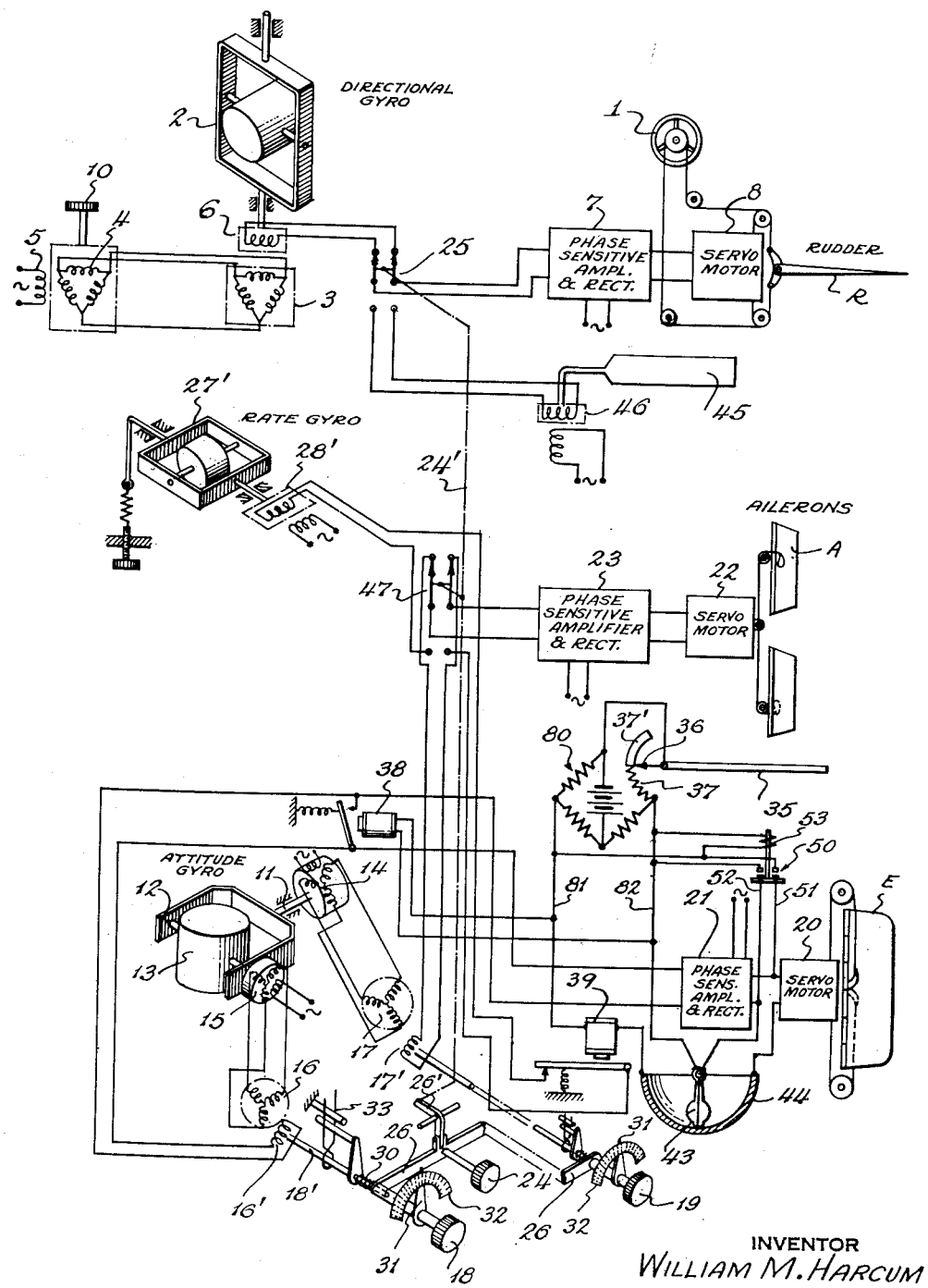
INVENTOR
WILLIAM M. HARCUM
BY
Herbert H. Thompson
HIS ATTORNEY Patented Mar. 2, 1954

2,670,911

UNITED STATES PATENT OFFICE 2,670,911

AUTOMATIC RECOVERY PILOT FOR AIRCRAFT

William M. Harcum, Bryn Mawr, Pa., assignor to The Sperry Corporation, a corporation of Delaware Application January 24, 1951, Serial No. 207,577

7 Claims. (Cl. 244—77)

This invention relates to automatic pilots for aircraft and, more particularly, to an improvement whereby the automatic pilot may be relied upon to bring the airplane back to a definite flight condition, such as straight level flight, regardless of attitude the craft may be in at the time the automatic pilot is thrown in, if such can be accomplished through the ordinary control surfaces of the craft. While the ordinary automatic pilot may be made to perform this function when the aircraft is not in an unconventional attitude or flying condition, and if the aviator remembers to first bring all setting knobs to zero, the aviator cannot rely on present automatic pilots to invariably perform this highly desirable function in an emergency because present-day automatic pilots do not operate properly under abnormal conditions such as upside down flight, or flight at very steep bank angles, on the order of 90°, nor when the airplane has lost its proper sustaining air speed.

According to my invention, I propose to provide an improved automatic pilot which may assume or be caused to assume control at any time, even if the aviator is disabled, and which may be relied upon to bring the airplane into straight, level flight under those unusual flight conditions which can be recovered from through proper operation of the usual control surfaces of the craft.

This application is a continuation-in-part of my prior application, now Patent No. 2,595,250, for Automatic Recovery Pilots for Aircraft, dated May 6, 1952.

The single figure of the drawings is a diagram illustrating one form of my invention as applied to an automatic pilot system for aircraft.

Since automatic pilots for aircraft are now well-known, I have illustrated the same diagrammatically in the present application. In the single figure, the airplane is shown as controlled by means of the usual rudder R, elevator E and ailerons A, each of which may be controlled directly by hand as well as automatically through servomotors. For the sake of simplicity, only the hand control 1 for the rudder is shown. For automatically controlling the rudder, there is shown a course maintaining device such as a directional gyroscope 2 of conventional type, from which a signal is generated as by a selsyn signal generator 3 having its rotor 6 connected to the gyroscope for operating the rudder servomotor 8 to maintain the course. A change of course may be readily effected by a second selsyn generator 4, the polyphase windings of which are cross-connected to the polyphase windings of generator 3. The single-phase winding of one of these generators, shown as winding 5 of generator 4, is connected to a single-phase source. Any relative displacement of the two windings of generator 3 with respect to those of generator 4 supplies an alternating signal voltage to the phase-sensitive amplifier and rectifier 7 having a reversible direct current output controlling the servomotor 8 which turns the rudder R. Motor 8 may be a conventional direct current motor, a relay-controlled hydraulic motor or other convenient source of power. Change of course is effected by turning a knob 10 to displace one of the windings 4 or 5 with respect to the other.

Similar selsyn signal generators 14 and 15 are shown about the major and minor axes 11 and 12 of the stabilizing or attitude gyro 13. In this case, the single-phase windings of the generators 14 and 15 are connected to an alternating current source and the signals are supplied from the single-phase windings of the settable generators 16 and 17. The latter are positioned from pitch controlling knob 18 and roll controlling knob 19, respectively, so that any desired pitch or roll may be set in without disturbing the gyroscope. The pitch signal is shown as controlling the servomotor 20 operating the elevator E through the phase-sensitive amplifier and rectifier 21, and the roll signal is shown as operating the ailerons A through servomotor 22 and phase-sensitive amplifier and rectifier 23. The knobs normally remain in any position set because of a detent 31 fixed to each which is held in yielding engagement with fixed toothed sector 32.

The parts so far described are intended to represent any conventional automatic pilot to which my improvements may be applied with appropriate modifications, as will be now described.

In order that the automatic pilot may be instantly conditioned for automatic recovery, I have shown a single knob 24 which may be pushed in to accomplish this purpose. This knob is shown as connected to a cross bar 26 which may be pinned to the lower end of bell crank lever 26'. When the knob 24 is pushed inwardly, it pushes bar 26 rearwardly, pushing the splined sleeves 29, on which knobs 18 and 19 are mounted, rearwardly against the action of coil springs 30 thus releasing the spring detents 31 from engagement with serrations on the back side of the fixed sectors 32. Centralizing springs 33 are shown secured to the shafts 18' and 19' carrying signal windings 16' and 17', respectively. Upon release of the detents, springs 33 return the signal generators to their normal positions with respect to the polyphase windings, so as to eliminate any turn or dive signals that might have been set in by the knobs 18 and 19 and bring the craft to level flight because of unbiased signals from 17' and 16'.

The bell crank 26' is connected through a linkage system, shown diagrammatically at 24' to throw-over switch or switches designed to sever the control of the heading of the craft from the directional gyro and place such control under other elements designed to stop turning regardless of the ultimate heading. I have shown for this purpose, two switches 25 and 47, both connected to the linkage 24' and normally in the upper position shown, when the automatic pilot is in normal operating condition, at which time it may be either controlling the craft or not, as desired, under the control of a master power supply switch (not shown). When, however, knob 24 is pushed inwardly it throws both switches into the down position. To stop turning, I have shown two auxiliary control devices, one being a side slip detector in the form of a vane 45 pivoted about a normally vertical axis, which is thrown into control of the rudder for automatic recovery when switch 25 is thrown down. When there is no side slip present, no signal is given by the signal generating transformer or pick-off 46 connected thereto. In the presence of side slip in one direction or the other, a signal of one phase or the other, is transmitted to the phase-sensitive rectifier 7 in control of the rudder.

When button 24 is pushed in, switch 47 is also thrown downwardly to disconnect the signal from selsyn 17' from the aileron control and to place the ailerons in control of rate of turn gyroscope 27', so that turns are eliminated by aileron displacement rather than by rudder displacement. In other words, pushing in the knob 24, transfers the control of the ailerons from the roll pick-offs 17 and 17' at the attitude gyro to the pick-off 28' on the rate gyro 27'. The rate gyroscope will therefore not only eliminate any turning, but will eliminate bank of the craft, since the two are tied closely together and bank cannot occur without causing turning, unless side slip is present, and side slip is prevented by the detector 45 operating on the rudder servomotor.

If it should happen, however, that at the time the automatic pilot is thrown in, the airplane has insufficient air speed so that it has stalled or is likely to stall, I prefer to prevent the gyroscope 13 from assuming or retaining control of the elevator for the time being and to cause the airplane temporarily to dive until its air speed is regained. For this purpose I employ some form of stall or near-stall detector such as an angle-of-attack vane 35 which normally provides no signal in the system, but which, if the angle of attack is too great, applies a down signal to the elevator and throws out the gyroscopic control about both the pitch and preferably also the roll axis. For this purpose, the angle-of-attack vane is shown as having a contact 36 riding over a conducting sector 37' and a resistance 37 forming a part of a Wheatstone bridge 80. As long as the vane is in the position shown, or engages the segment 37', it has no effect in the system. If, however, the rear of the vane should be tilted upwardly, caused by the loss of angle of attack, balancing resistance 37 is reduced and current is caused to flow between the opposite corners of the bridge to supply an E. M. F. to wires 81 and 82.

This performs the following operations in the system: it severs or neutralizes the normal pitch signal from the stabilizer gyroscope 13; it likewise preferably severs or neutralizes the normal roll signal from the rate gyro and it causes the aircraft to dive. To accomplish these results, (1) The vane 35 excites an electromagnetic relay 38 to short-circuit the signal from winding 16' and thereby render ineffective the pitch signal from the gyroscope.

(2) It excites an electromagnetic relay 39 and thereby opens the circuit of the roll signal from winding 28' and thereby temporarily severs the control from the rate gyroscope to the ailerons. This is considered desirable although it may not be necessary, since recovery of flying speed is of paramount importance.

(3) The signal across the potentiometer 80 is applied directly (or through an amplifying relay) to the direct current servo motor 20 of the elevator to cause diving at an angle proportional to the departure of the vane 35 from the normal position.

As soon as the correct angle of attack is restored, the controls are returned to the gyro vertical by the disappearance of an E. M. F. across wires 81 and 82.

In case, however, the airplane is upside down or in a bank angle of more than 90°, I prefer to first roll the airplane over to less than a 90° bank, before the gyro stabilizer or attitude gyro pitch control is thrown in, and even before the air speed recovery mechanism becomes operative. This is to prevent reverse operation of the elevator in case the aircraft is upside down or approaching such condition, under which conditions the ordinary elevator control from the gyro vertical of the automatic pilot would be in the wrong direction to right the craft. In other words, the elevator signals from the gyro-vertical are reversed and hence worse than useless when the craft is upside down.

For this purpose, I have shown a damped pendulum 43 pivoted at the center of hemispherical conducting bowl 44, so that in case the pendulum leaves the bowl, the main circuit between the amplifier 21 and the elevator servo motor 20 is severed. It should be noted, however, that the aileron control from the rate gyro preferably remains in operation to right the craft, when upside down, even though the craft has insufficient air speed. This is accomplished by connecting one lead 82 between potentiometers 37 and relay 39 through pendulum 43 and bowl 44 so that the relay is not energized if the craft is upside down even though lacking flying speed, and therefore the craft will be rolled over first.

Preferably, an anti-feedback relay 50 is interposed in the servomotor feed wires 51, 52 between potentiometer 37 and servo 20. Normally, said relay is biased to the open position, but when a signal appears across potentiometer 37 solenoid 53 closes the relay and supplies current to the servomotors to operate the elevators. In the open position, the relay prevents possible feedback from the output of amplifier 21 into the circuit affecting relays 38 and 39, so that said relays will not be operated by the current passing between amplifier 21 and servomotor 20 during normal operation.

From the foregoing, the operation of my invention will be apparent. The automatic pilot with the knobs 18 and 19 in normal position may be kept in use or not as desired by the operator. In case the airplane for any reason gets into a dangerous attitude or condition, the pilot merely pushes knob 24 in (if the automatic pilot is in operation) or if not in operation, he first throws the main switch (not shown) to place the automatic pilot in operation. By pushing in the knob 24, the automatic pilot is placed in condition to right the aircraft and resume normal flight conditions, if this is possible, through operation of the normal control surfaces of the craft. Turning of the craft is at once stopped and the craft rolled over if upside down or in a steep bank. Flying speed is also restored by the operation of the stall detector in connection with the elevator servomotor. As soon as the plane has reached a near normal speed and attitude, the knob 24 may be pulled out and normal automatic or manually controlled flight resumed.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An automatic recovery safety device for automatic pilots for aircraft having rudder, roll and pitch servomotors, the combination with a direction maintaining instrument for controlling the rudder servo, and an attitude instrument for controlling the roll and pitch servos, of an auxiliary rate of turn gyro responsive to turns in azimuth for alternatively controlling the roll servomotor, manual controllers for causing roll and pitch by altering the outputs from said attitude instrument, and throwover means for severing the control of said rudder servo from said direction instrument, for zeroing the manual controllers associated with said attitude instrument and for transferring the control of the roll servomotor from said attitude instrument to said rate of turn gyro.

2. An automatic recovery safety device for automatic pilots for aircraft having rudder roll and pitch servos including a direction maintaining instrument for controlling the rudder servo, an attitude instrument for controlling the roll and pitch servos, an auxiliary side slip detector for alternatively controlling the rudder, an auxiliary rate of turn responsive device for alternatively controlling the ailerons, manual control means for causing pitch by altering the output from said attitude instrument, and throwover means for transferring control of the rudder servo to said side slip detector, for transferring control of the roll servo to said rate of turn responsive device and for zeroing said pitch causing manual control means.

3. In an automatic recovery pilot for aircraft, a gyro-vertical, an aileron servomotor normally controlled therefrom, a course maintaining means such as a directional gyroscope, a rudder servomotor normally controlled therefrom, a normally idle rate-of-turn gyroscope responsive to turns in azimuth, a normally idle side slip detector, means for transferring the control of the aileron servomotor from the gyro-vertical to said rate-of-turn gyroscope, means for transferring the control of the rudder servomotor from said course maintaining means to said side slip detector, and a common means for actuating at will said two transfer means whereby both bank and turn are eliminated without reference to course.

4. In an automatic pilot for aircraft having the normal direction maintaining and anti-roll instruments, rudder and aileron servo-motors respectively normally controlled from said instruments, manual means for altering the output of said instruments for causing turn and bank of the craft, and auxiliary means for causing the automatic pilot to recover level straight flight from unusual flight conditions including a normally idle side slip detector and a rate of turn responsive device responsive to turning in azimuth, means for transferring the rudder servo from the control of the direction maintaining instrument to the control of said side slip detector, and means for transferring the control of the aileron servo to said rate of turn responsive device, whereby level straight flight is re-established through the automatic pilot.

5. In an automatic pilot for aircraft having the normal bank and pitch stabilizer and rudder controlling instruments, manuel means altering the output of said instruments for causing bank, pitch and turn of the craft, auxiliary means causing the automatic pilot to recover level straight flight from unusual flight conditions including a side slip detector and a rate of turn responsive device, means for transferring the rudder servo from the control of the normal rudder control instrument to said side slip detector, means for transferring the control of the bank stabilizer control instrument to said rate of turn responsive device, means for simultaneously zeroing said manual altering means for the pitch stabilizer instrument, means responsive to stall conditions for causing diving of the craft independently of the normal pitch stabilizer instrument until proper flying speed is restored, and means for thereafter retransferring the pitch control to the normal pitch stabilizer instrument whereby level straight flight is re-established through the automatic pilot.

6. In an automatic pilot for aircraft having the normal bank and pitch stabilizer and rudder controlling instruments and respective servomotors, manuel means for altering the output of said instruments for operating the bank, pitch and turn servos of the craft, auxiliary means causing the automatic pilot to recover level straight flight from unusual flight conditions including a side slip detector and a rate of turn responsive device, means for transferring the control of the rudder servo from the normal rudder instrument to said side slip detector, means for transferring the control of the bank stabilizer servo to said rate of turn responsive device, means for simultaneously zeroing said manual altering means for the pitch stabilizer servo, means responsive to an upside down condition of the craft for disabling the normal pitch stabilizer control until the craft is righted under control of the said rate of turn responsive device, and means for thereafter retransferring the pitch servo to the normal pitch stabilizer instrument whereby level straight flight is re-established through the automatic pilot.

7. In an automatic recovery safety device for automatic pilots for aircraft having roll and pitch servos, an attitude instrument, means connecting said instrument to said roll and pitch servos for controlling roll and pitch, an auxiliary rate of turn device responsive to turns in azimuth, manual control means for causing roll and pitch by altering the outputs from said attitude instrument controlling the roll and pitch servos, and throwover means for transferring control of the aileron servo to said rate of turn responsive device and for zeroing said roll and pitch causing manual control means.

WILLIAM M. HARCUM.

References Cited in the file of this patent

UNITED STATES PATENTS

| Number | Name | Date |
|---|---|---|
| 1,832,433 | Tarbox | Nov. 17, 1931 |
| 1,876,254 | Marmonier | Sept. 6, 1932 |
| 1,897,285 | Veit | Feb. 14, 1933 |
| 2,020,105 | Constantin | Nov. 5, 1935 |
| 2,238,300 | Zand et al. | Apr. 15, 1941 |
| 2,280,116 | Carlson | Apr. 21, 1942 |
| 2,400,701 | Meredith | May 21, 1946 |
| 2,439,750 | Nisbet et al. | Apr. 13, 1948 |
| 2,499,664 | Meredith | Mar. 7, 1950 |